United States Patent [19]
Hörnberg

[11] Patent Number: 4,767,144
[45] Date of Patent: Aug. 30, 1988

[54] HOOK ASSEMBLY

[76] Inventor: Gunnar Hörnberg, Härdarvägen 20, S-730 60 Ramnäs, Sweden

[21] Appl. No.: 30,840
[22] PCT Filed: May 30, 1986
[86] PCT No.: PCT/SE86/00252
  § 371 Date: Feb. 5, 1987
  § 102(e) Date: Feb. 5, 1987
[87] PCT Pub. No.: WO86/07582
  PCT Pub. Date: Dec. 31, 1986

[30] Foreign Application Priority Data

Jun. 19, 1985 [SE] Sweden ............................... 8503067

[51] Int. Cl.[4] .......................... B66C 1/38; A44B 13/00
[52] U.S. Cl. .................................. 294/82.36; 24/233; 24/241 SB
[58] Field of Search ............... 294/82.36, 82.26, 82.19, 294/82.22, 82.20; 24/230.5 R, 241 P, 241 PP, 241 PL, 241 SB, 242, 232 R, 233

[56] References Cited

U.S. PATENT DOCUMENTS 3,871,698  3/1975  Fontana ........................ 294/83 R
3,918,758  11/1975  Fournier ....................... 294/83 R
4,379,579  4/1983  Mahan et al. .................. 294/83 R

FOREIGN PATENT DOCUMENTS

0081844  6/1983  European Pat. Off. .
3500288  9/1985  Fed. Rep. of Germany .
62516    11/1977  Finland .
61015    12/1978  Finland .
226020   3/1968   Sweden .
85006070 4/1969   Sweden .
935434   1/1980   U.S.S.R. ..................... 294/82.36

Primary Examiner—James B. Marbert
Attorney, Agent, or Firm—Witherspoon & Hargest

[57] ABSTRACT

The invention relates to a hook assembly of the type comprising a lifting eye bolt (2) and a hook (4) mounted in either end of a body (3), and a combined latch-ejector unit (31) rotatable between a first position for locking the opening of the hook (4) and a second position for uncovering the opening of the hook and releasing a load suspended therein, and with operating means (24) for adjustment of the latch-ejector unit between the said positions. According to the invention the hook (4) is firmly mounted in the lower end of the body, the lifting eye bolt (2) is mounted with limited mobility in the upper end of the body (3) and at least one energy-accumulating member (15) is operatively inserted between the body (3) and the lifting eye bolt (2) for storing energy therein upon relative movement between the lifting eye bolt and the body due to the application of load to the hook assembly (1), the energy accumulated in the energy-accumulating member (15) upon subsequent relief of the load from the hook assembly being transferred via a locking and transmission link system (12, 18, 21) to the latch-ejector unit (31) for adjustment thereof between the first and second positions.

18 Claims, 5 Drawing Sheets

HOOK ASSEMBLY

BACKGROUND OF THE INVENTION

The invention generally relates to hook assemblies comprising an ejector for releasing a load suspended in the hook assembly; the invention particularly refers to such a hook assembly comprising a lifting eye bolt and a hook positioned at opposite ends of a body as well as a combined ejector and latch device rotatably connected to the hook and adapted, in a first position, to detend a load suspended in the hook and, upon shift to another position, to release the load from the hook.

Load hooks have been known for a long time which are provided with a latch rotatably arranged at the hook opening permitting insertion of the lifting implement in the hook but preventing unintentional release therefrom. A further development of the load hook comprising a latch is a security hook, such as Gunnebo Original BK, in which the lifting eye and the latch are integrated and are articulately connected to the hook, the construction being such as to automatically close the latch when the security hook is loaded, opening being prevented until the load is to be released from the hook and a latch is operated. The main purpose of the hooks mentioned above is to prevent unintentional release of a supported load if the load during lifting unintentionally comes into contact with some object causing the hook accidentally to be relieved from the load; in this respect the hooks in question have been working satisfactorily on several fields of use. The drawback inherent in these hooks, however, resides in that in every case manual operation and uncoupling is required, the uncoupling in particular being a dangerous moment in connection with certain handling of goods in the industry, stevedore work and on the building field, etc. where the load, for example, comprises a number of heavy, loose parts which, when released, may start moving and hurt the operator. From U.S. Pat. No. 3,918,758 a lifting hook is known intended to solve the last-mentioned problem by rotatably providing thereon a combined ejector and latch which is manually operable from a place securely spaced from the load. The function is such that the operator, after having relieved the load from the hook by placing the load on the ground, pulls a line or rope attached to the ejector and thereby causes the ejector to turn in such a way that the load is released from the hook while at the same time the latch uncovers the opening of the hook. The important disadvantage of this known hook resides in that it is practically impossible to use in certain situations when the line for some reason can not freely be extended to the place of the operator. Other disadvantages of the known hook reside in the fact that it has protuding portions which during lifting tend to be entangled with other objects in the environment and that, due to some constructive details, no secure function can be guaranteed after an extended time of use, in particular outdoors when the hook constantly is exposed to wind and weather.

Recently such releasable hook assemblies have been further developed by being provided with remotely controlled operating means for the ejector and latch unit. In this connection both electric and hydraulic motors have been used as operating means, remote control having been performed by means of radio signals or via control conduits. While such additionally developed hook assemblies as a rule function satisfactorily, they are comparatively expensive in manufacture and, in addition, there is always a risk of faulty function by a faulty control signal, for example due to the human factor, being supplied to the control means, or due to damage done to the control conduits and, in the case of radio control, due to the triggering of a faulty function under the action of other radio transmitters. From, for example, Swedish patent specification No. 226 020 and Finnish published and printed specifications Nos. 61015 and 62516 hook assemblies are known in which a coupled load after having being placed on the ground is released by rotating the entire hook about a pivot so that the hook opening is directed downwardly. In addition to the fact that such solutions, in particular in hook devices used for heavy loads, require an expensive, functionally secure rotary support of the hook, such devices are extremely unsatisfactory in view of the fact that at faulty function due to faulty operation or breakage of some of the details which in the lifting position lock the pivotable hook, the load is directly released because the load suspended on the hook continously tends to turn the hook into the released position.

SUMMARY OF THE INVENTION

Thus, the object of the present invention is to provide a hook assembly of the type mentioned initially which during lifting securely latches the load supported by the hook but which after relief of the weight automatically releases the latch and discharges the load from the hook and which in addition is comparatively cheap to manufacture.

This object is achieved by means of the hook assembly of the type indicated in the attached claims from which, in addition, the particular characteristics of the invention will appear.

BRIEF DESCRIPTION OF THE DRAWINGS

An embodiment of the invention will be described in detail hereafter by reference to the attached drawings in which.

DETAILED DESCRIPTION

Figure 1:
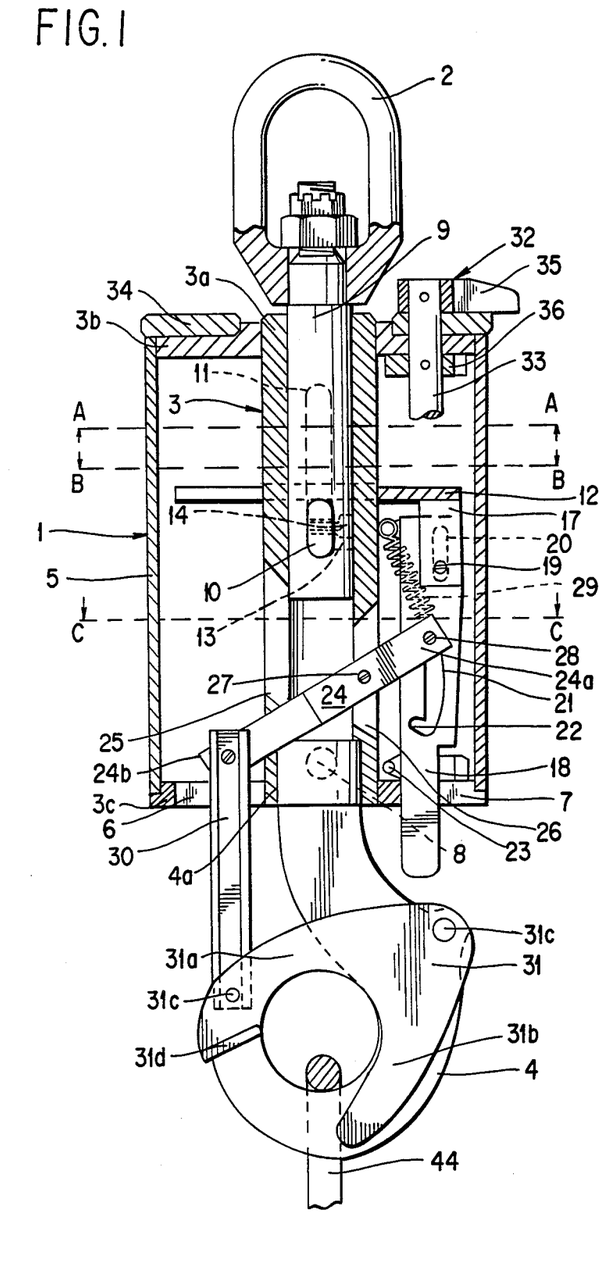
FIG. 1 is a plan view showing a preferred embodiment of the hook assembly according to the present invention with certain portions sectioned and with gas springs and dampers omitted for the sake of clarity, FIGS. 2a, b, c show cross sections of the hook assembly shown in FIG. 1 along lines A—A, B—B and C—C, respectively, FIGS. 3 and 4 schematically show the hook assembly shown in FIG. 1 in two different working positions, certain components in the hook assembly only being faintly outlined in order additionally to emphasize the function of other components.

As appears in particular from FIG. 1, the hook assembly 1 fundamentally comprises a lifting eye bolt 2, a body 3 and a hook 4. The body comprises a preferably cylindrical central tube 3a at the ends of which respectively an upper flange 3b and a lower flange 3c are attached. Flanges 3b and 3c are suitably annular and between them an outer protective casing 5 is inserted to protect the components of the hook assembly. On the outer surface of the upper flange 3b an outer ring may be attached pivotally supporting a rod belonging to a manually operable latch as will be described later on.

The lower flange 3c has diametrically opposed recesses 6, 7 receiving respectively a lifting link and a lock arm to be described further below.

At its upper end the hook 4 is provided with an outer thread 4a to permit this end to be screwed into the lower end of the central tube 3a having a corresponding inner thread. To prevent the hook from being screwed out of the central tube a hole 8 is provided in the central tube on the level of the upper end of the hook when it is screwed into the central tube, whereby the hook may be weldingly attached to the central tube through this hole 8. The lifting eye bolt 2 at its end facing the body 3 is provided with a shank 9 slidingly inserted into the central tube to permit displacement of the eye in relation to the body. Suitably the lifting eye is rotatably connected to shank 9 to limit the movement of the lifting eye bolt 2 in relation to the body 3 and, for transmitting this movement to the latch and transmission link system described hereafter, shank 9 is provided in the range of its end inserted into the body with a lifting shaft 10 extending diagonally through shank 9 and protruding therefrom on both sides. Both protruding ends of the lifting shaft extend also through diametrically opposed slits 11 in the central tube 3a whereby the range of movement of the lifting eye bolt is limited due to the contact of the lifting shaft with the ends of slits 11. As appears from FIG. 1 the lifting shaft and the slits suitably are provided with corresponding rounded ends to provide a more favourable transmission of forces between them.

A generally U-shaped yoke 12 is provided around the central tube 3a above the lifting shaft 10, said yoke being displaceable along the central tube. In the embodiment shown the yoke has two ears 13 on its lower side provided on opposite sides of the central tube 3a in the mounted condition; by means of these ears the yoke 12 is firmly connected with the respective protruding ends of the lifting shaft 10, for example by means of bolts 14. This rigid connection between the lifting shaft and the yoke is not a necessary provision for the function of the lifting device but is primarily intended to stabilize the yoke to avoid tilting and jamming against the central tube, this rigid connection thus being dispensable in case other measures are taken to stabilize the yoke. In the second place this rigid connection also prevents a quick downward movement of the lifting eye and its shank 9 upon load release, because damage might otherwise be caused by an impact-like contact between the lower ends of the lifting shaft and the slits.

Figure 5:
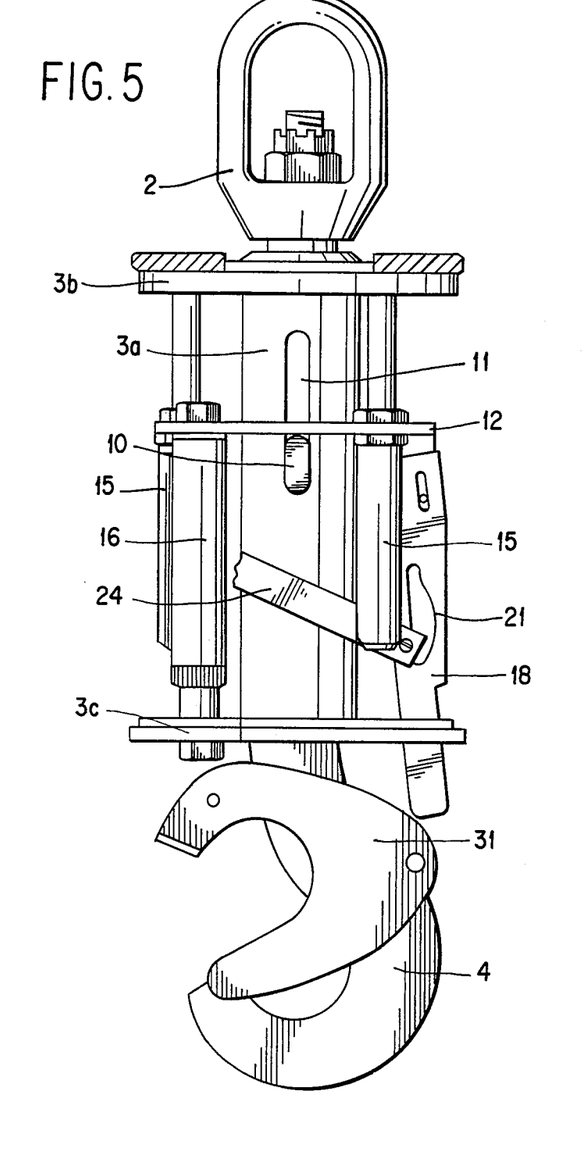
FIG. 5 is a schematical illustration showing the position of the gas springs and damper.

As shown in FIG. 5, the yoke 12 is operatively connected by means of a number of gas springs 15 with the upper flange 3b whereby, in a way described hereafter, energy is stored in the gas springs when the hook assembly is loaded, said stored energy being used, when unloading the lifting device after a previous loading, for the automatic release or uncoupling. In the embodiment shown two gas springs 15 are provided but the number may vary depending on the field of use. The piston rod ends of the gas springs 15 are attached to the yoke 12 and the gas springs act with the free ends of the piston rods directly against the lower side of the upper flange 3b. Moreover, yoke 12 is connected to the lower flange 3c via a single-acting damper 16 which is degressive as to its function producing a big damping force in the beginning of its stroke and a small damping force at the end of its stroke; the purpose of this action will be described below. The rear face of the damper 16 is attached to the yoke 12 and the free end of the piston rod of the damper is connected to the lower flange 3c.

At its lower surface the yoke 12 is additionally provided with a bracket 17 comprising two plates disposed in a mutually spaced, side-by-side arrangement, said plates straddling a lock arm 18 mounted therebetween. By means of a stud 19 firmly attached to the holding plates the lock arm is shiftably and rotatably journalled in an oblong slot 20 in the upper end thereof. In the central portion of the lock arm 18 a guide groove 21 is provided which in its lower end comprises a locking notch 22 directed inwardly towards the central tube. The lower portion of the lock arm extends through the recess 7 mentioned above in the lower flange 3c to act as an operating arm during closing of the latch of the hook assembly. Said lower portion also carries a stop dog 23 limiting the downward movement of the lock arm.

On the level of the guide groove 21 in the lock arm 18 a transmission arm 24 is provided which extends through diametrically opposed recesses 25, 26 provided in the central tube 3a. In its central portion the transmission arm is rotatably journalled in the central tube 3a by means of a pivot 27, the end 24a of the transmission arm facing the lock arm 18 being bifurcated with the legs of the fork straddling the lock arm and being mutually connected within the range of the guide groove 21 of the lock arm by means of a peg 28 passing through the guide groove 21. Between the end 24a of the transmission arm 24 and the upper portion of the lock arm 18 a tension spring 29 is provided biasing the transmission arm to rotate counterclockwise about the pivot 27 and biasing the lock arm 18 for swinging movement in an outward direction from the central tube 3a around stud 19.

The end 24b of the transmission arm 24 spaced from the lock arm 18 extends through a recess 25 in the central tube 3a and is pivotally connected to a lifting link 30 extending downwardly through said recess 6 of the lower flange 3c. At its other end the lifting link 30 is pivotally connected to a substantially V-shaped combined ejector and latch 31 which is rotatably attached to hook 4 for swinging movement between a first latching position in which one shank 31a of the V-shape closes the opening of hook 4 and prevents the load attached thereto from being released, and a second position in which the latch shank 31a uncovers the hook opening and the second shank 31b of the V-shape after relief of the load detaches the load carried by the hook. During the swinging movement from the first position mentioned above to said second position the ejector shank 31b thus carries the lifting means held by the hook towards the hook opening so that in said second position the lifting means are completely released and fall out of the hook. Suitably the combined ejector and latch 31 is constituted by two plates spaced from each other on either side of the hook 4 and having the V-shape mentioned above and being mutually connected by means of studs 31c for rotatable connection to the hook and the lifting link as well as by any additional reinforcing means 31d.

Figure 2A:
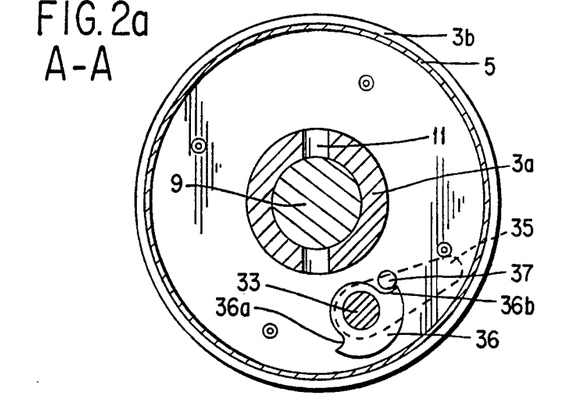
Figure 2B:
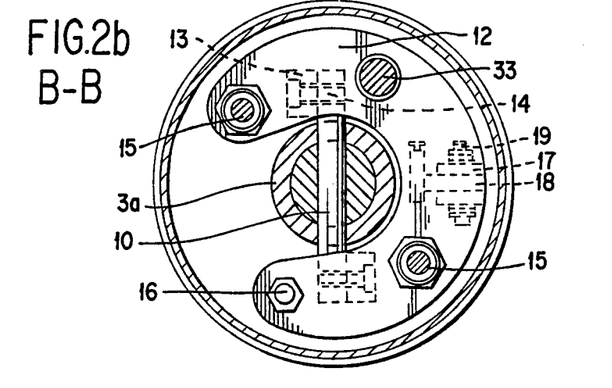

In the embodiment shown the hook assembly, in addition, is provided with a manually actuatable locking device by means of which the automatic release or disengagement of the hook assembly may be blocked. The locking device 32 fundamentally comprises an operating rod 33 which is rotatably journalled in the lower flange 3c and in the upper flange 3b, specifically, in the embodiment shown, in the ring 34 connected to the upper flange 3b. The upper end of the operating rod 33 extends past ring 34 and is non-rotatably connected to an operating arm 35 by means of which the operating rod can be turned between locking and releasing positions. These positions are determined with the aid of a stop plate 36, also nonrotatably mounted on the operating rod, said stop plate 36 having two contact surfaces 36a and 36b (compare FIG. 2a) which in the release and locking positions, respectively, come into contact with a stop 37 provided on the lower surface of the upper flange 3c. In connection with the end of the operating rod 33 journalled in the lower flange 3c a plate 38 is non-rotatably attached to the operating rod, said plate 38 on its under surface carrying an operating dog 39 having an outer cam surface 39a adapted to cooperate with surfaces 40a on the respective legs 40b of a fork-shaped locking link 40 for shifting the locking link between releasing and locking positions. The locking link 40 is rotatably mounted at the lower flange 3c and is provided at its end remote from the legs with a locking arm 41 which in the locking position is in contact with the outer surface of the lock arm 18 to prevent this arm from moving outwardly in the direction away from the central tube 3a whereby the locking peg 28 is prevented from coming into engagement with the locking notch 22 of the guide groove 21. As will be explained more clearly further down, the automatic release of the hook assembly is thereby prevented. Between plates 38 and an attachment point 43 in the lower flange 3c a spring 42 is inserted, said spring consisting of a spring wire bent into U-shape between the attachment point 43 and the attachment point on plate 38. Thus, when the operating arm and thereby the plate are turned between the release and locking positions, respectively, the spring will be moved past a dead centre between opposed sides in relation to an imaginary line through the attachment point 43 and the central axis of operating rod 33, whereby a biasing action is obtained towards the respective adjusted position.

Figure 3:
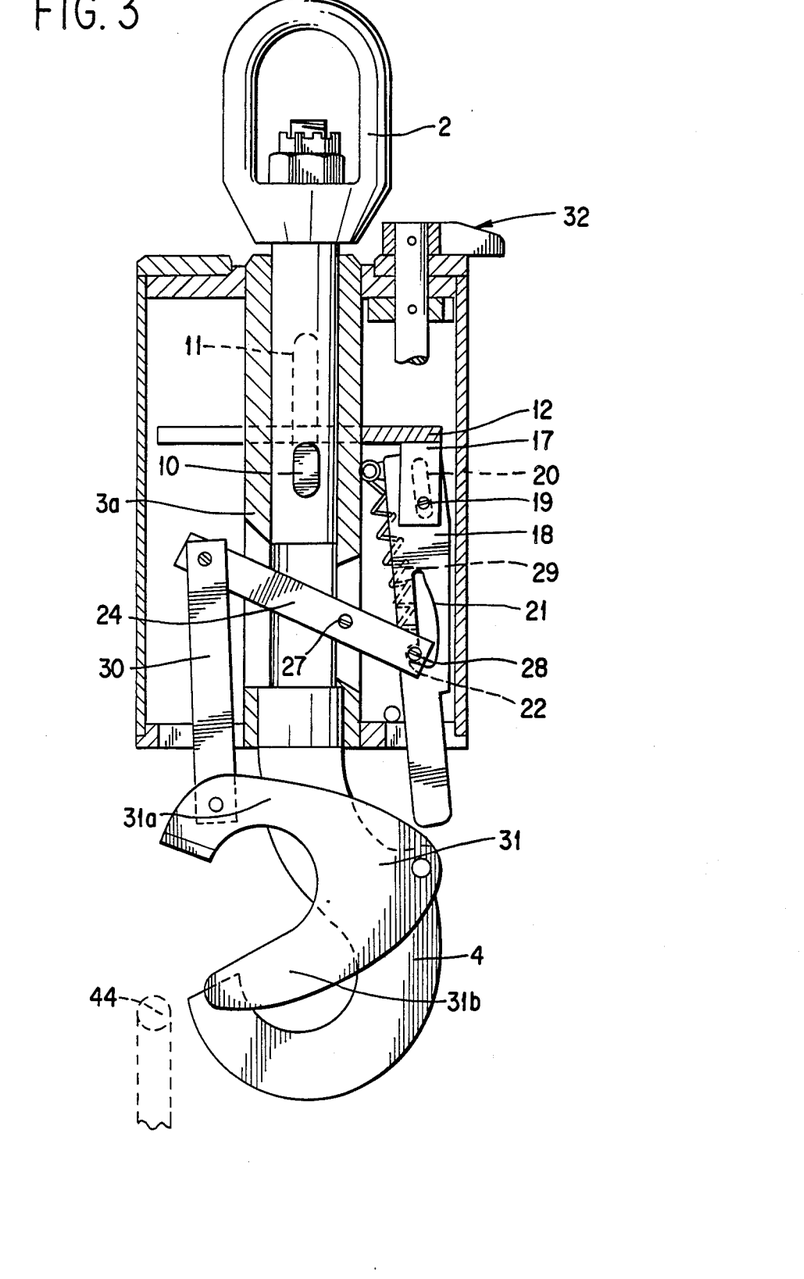

By reference to the above description the function of the hook assembly according to the invention will now be described:

In FIG. 3 the hook assembly is shown in the starting position, i.e. after automatic discharge of a load from the hook 4 and when a new load, illustrated by a faintly outlined lifting eye 44, is to be attached to the hook. Lifting eye 44 is introduced into the opening of the ejector-latch unit 31 between the shanks 31a, 31b thereof, whereafter the ejector-latch unit is manually closed by actuating the lock arm 18 at the lower portion thereof extending through recess 7 in the lower flange 3c. Lock arm 18 is moved to the left in the drawing to move peg 28 out of contact with the locking notch 22 enabling the ejector-latch unit to be closed since the transmission arm 24 is free to rotate around peg 27 as the latch peg is free to move upwardly in the guide groove 21 to the position shown in FIG. 1 where the ejector-latch unit is shown in the closed position with the lifting eye 44 attached to hook 4, but with the lifting device unloaded whereby the yoke 12 and thereby the lifting eye 2 together with its shank 9 is held by the gas springs in their lowermost positions. Specifically the outer ends of the piston rods of the gas springs 15 act against the lower side of the upper flange 3b and thus urge yoke 12 in a downward direction causing the yoke by its connection with the lifting shaft 10 to hold the lifting eye 2 in its lowermost position.

Figure 4:
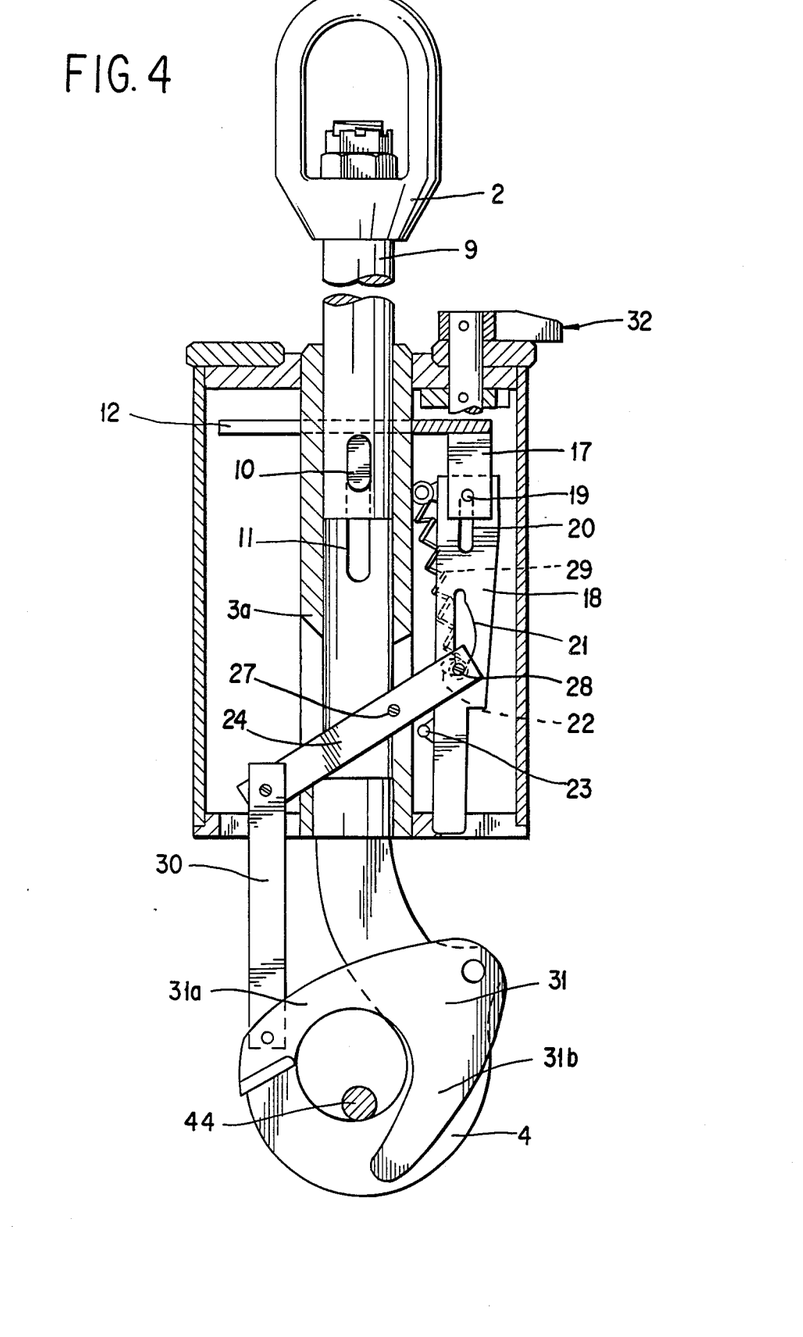

When the load is lifted and the weight thereof charges the hook the lifting eye bolt 2 tends to move in an upward direction away from hook 4 to move the yoke in an uwpard direction, due to the connection between the lifting shaft 10 and the yoke 12. As mentioned above, the damper 16 is of the single-acting type and will be pulled out without any damping effect during the upward movement of the yoke. However, a damping effect against the upward movement will be brought about with the aid of the gas springs 15 the piston rods of which during the said movement will be urged inwardly to store energy therein by compression of the gas. By means of this damping effect the upward movement of the lifting eye bolt 2 will be comparatively smooth and slow whereby the risk of damage is avoided when the lifting shaft 10 comes into contact with the upper ends of slits 11. The upward movement of the lifting eye bolt 2 and the yoke 12 continues until the parts have assumed the position shown in FIG. 4 in which the weight of the attached load is transmitted via the hook 4 to the central tube 3 and via the upper ends of the slits 11 to the lifting shaft 10 and to shank 9 of the lifting eye bolt 2. In this position the gas springs are fully loaded and the yoke 12 has been moved so far in an upward direction that stud 19 of bracket 17 is in engagement with the upper end of slot 20 in the lock arm which due to this contact has been moved upwardly to such an extent that peg 28 of the transmission arm 24 assumes the position shown in FIG. 4 at the lower end of guide groove 21. Due to the bias of spring 29 the lock arm will now be swung to the right in FIG. 4 about stud 19 causing peg 28 to enter into the locking notch 22. In FIG. 4 the lock arm is shown in the position in which it is blocked when the locking device 32 is moved to the locking position preventing peg 28 from entering into the locking notch 22 and instead only moving freely in guide groove 21 when the lock arm is moved upwardly or downwardly. The automatic release described further down is prevented hereby, such release requiring that the peg has assumed its position in the locking notch 22 as shown in FIG. 3.

The hook device now is in the condition shown in FIG. 4 apart from the fact that peg 28, as mentioned before, is introduced into the locking notch 22. When the load is then put down on the desired place and the hook assembly is relieved from the load, the energy built up in the gas springs by compression of gas during lifting causes the gas springs to move the yoke 12 in a downward direction towards hook 4 simultaneously moving the lifting eye bolt 2. In this phase the damper 16 comes into action and opposes the downward movement of the yoke. As the damper 16 is degressive as to its function, as mentioned before, the damping force is greatest in the beginning of said movement. Thus, the movement will be slow in the beginning and this fact, in combination with the fact that stud 19 initially moves freely in the slot 20 of the lock arm 18, prevents the locking arm from being actuated during the first portion of the downward movement of the yoke. Hereby a time delay is achieved prior to actuation of the lock arm to open the latch and put the ejector into action. It is the purpose of this time delay to prevent the ejector from being actuated in such a case when the hook unintentionally is relieved of the load due to the fact that the load comes into contact with some object in the environment before being put down on the intended place. A time delay of between 3 to 5 seconds prior to actuation of the ejector has been found to be suitable in most cases, but the damper is suitably adjustable to modify the time delay.

After the lost-motion movement of stud 19 in relation to slot 20 the stud comes into contact with the lower end of the slot and moves the lock arm downwardly. Because the peg 28 of the transmission arm 24 is engaged in the locking notch 22 the transmission arm will be swung during this part of the movement in a clockwise direction shown in the figures about pivot 27 causing the lifting link 30 to turn the ejector-latch unit 31 so that the latching shank 31a uncovers the hook opening and the ejector shank 31b releases the load engaged in the hook. The hook assembly is now in the state shown in FIG. 3, ready for the attachment of a new load and for closing the latch in the way described above.

Figure 2C:
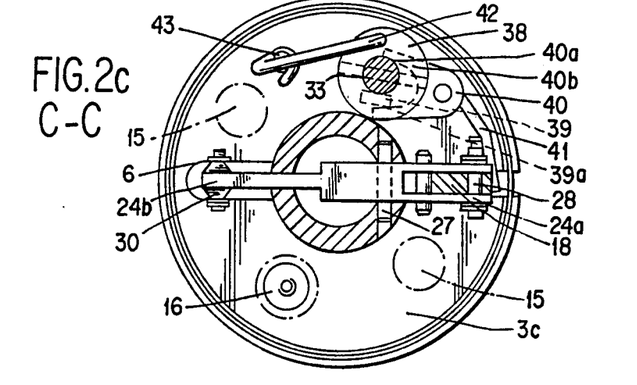

As mentioned above it may in certain cases be suitable to block the automatic ejection and for this purpose the locking device 32 is provided. In such a case operating rod 33 is operated with the aid of operating arm 35 causing the cam surface 39a of operating dog 39 to abut against surface 40a on the outer fork leg 40b whereby the locking arm 41 is caused to contact the outer surface of lock arm 8 as shown in FIG. 2c. As mentioned above this will prevent the lock arm from swinging to the right in FIG. 1 whereby the peg 28 of the transmission arm 24 is prevented from coming into engagement with the locking notch 22. During the up and down movement of the lock arm the peg 28 therefore will run freely in the guide groove 21 preventing the ejector-latch unit from being activated. However, when the load is relieved from the hook, the ejector-latch unit may be opened and closed manually.

It has been found suitable so to dimension the gas springs and the damper that when a load is attached to the hook, the locking device, i.e. the engagement between peg 28 and the lower end of the guide groove 21, shall come into action and hold the hook completely closed before the load acting on the hook has reached a value of about 2.5% of its permissible maximum load. When the load is relieved from the hook the lock 31a must not be opened or the ejector 31b be activated before the load acting on the hook has been lowered to about 0.5% of its permissible maximum load.

Even if the invention here has been described and shown by reference to a specific embodiment it should be appreciated that the invention is not limited to this embodiment and that modifications obvious to the expert shall be considered to be comprised by the invention. Thus, equivalent constructive details and obvious variations in the shape of the details can be performed within the frame of the invention. The scope of the invention is thus only limited by the attached patent claims.

I claim:

1. A hook assembly comprising a lifting eye bolt (2) and a hook (4) mounted at opposite ends of a body (3), a combined latch-ejector unit (31) rotatably disposed on the hook (4) for adjustment between a first position in which the hook opening is closed and a second position in which the hook opening is uncovered and for releasing a load attached to the hook and an operating device (24, 30) for adjustment of the latch-ejector unit between the first and second positions, the hook (4) being firmly mounted at the lower end of the body (3) and the lifting eye bolt (2) being mounted in the upper end of the body (3) for limited movement towards and away from the hook (4), at least one energyaccumulating member (15) being operatively inserted between the body (3) and the lifting eye bolt (2) for storing energy therein during the movement of the lifting eye bolt (2) away from the hook when the hook assembly (1) is exposed to load, a locking and transmitting link System (12, 18, 19, 20, 21, 22) being provided for transmitting, upon relief of the load from the hook assembly after a preceding loading, the energy stored in the energyaccumulating member (15) to the operating device (24, 30) of the latch-ejector unit (31) for automatic adjustment of the latch ejector unit between the first and second positions thereof, and a damper (16) operatively inserted between the body (3) and the lifting eye bolt (2) to delay, upon relief of the load from the hook assembly (1), the transmission of the accumulated energy of the energy-accumulating member (15) to the operating device (24, 30) of the latch-ejector unit (31) via the locking and transmitting link system (12, 18, 19, 20, 21, 22).

2. Hook assembly as claimed in claim 1, characterized in that the body is a cylindrical central tube (3a) in which a shank (9) connected to the lifting eye bolt (2) is slidably guided, said shank being provided, for limiting its movement within the central tube (3a), with a lifting shaft (10) diametrically extended through the shank (9) and protruding with its ends past the outer surface of the shank (9) and extending through respective slits (11) in the central tube limiting the movement of the shank (9) and thereby of the lifting eye bolt (2) by contact of the lifting shaft (10) with the upper and lower ends of the slits (11).

3. Hook assembly as claimed in claim 2, characterized in that the locking and transmitting link system comprises a yoke (12) disposed slidably about the central tube above the lifting shaft (10) and connected to the lifting shaft (10), said yoke on its lower side having a bracket (17) in which a lock arm (18) is rotatably journalled on a stud (19) and in that the lock arm (18) at a position spaced downwardly from the stud (19) has a guide groove (21, 22) engaged by a peg (28) provided in the operating device (24, 30) of the latch-ejector unit (31).

4. Hook assembly as claimed in claim 3, characterized in that said peg (28) is provided in one end of a pivotally mounted transmission arm (24) which is articulately connected to a lifting link (30) which in turn is articulately connected to the latch-ejector unit (31), said peg (28), during upward movement of the yoke (12) and thereby the lock arm (18), when the hook assembly (1) is under load, moves freely in the guide groove (21) and at the end of this movement is adapted to be inserted into a locking notch (22), the transmission arm (24) upon engagement of the peg (28) with the locking notch (22) being pivoted for shifting the latch-ejector unit (31) from the first position to the second position during downward movement of the yoke (12) when the load is relieved form the hook assembly.

5. Hook assembly as claimed in claim 3, characterized in that the energy-accumulating member (15) is a gas spring acting between the yoke (12) and an upper flange (3b) secured to the upper end of the body (3).

6. Hook assembly as claimed in claim 3, characterized in that the damper (16) acts between the yoke (12) and a lower flange (3c) secured to the lower end of the body (3), in that the damper has a degressive function such as to perform its greatest damping force during the first part of the downwardly directed movement of the yoke (12) and in that the stud (19) mounted in the bracket (17) moves in an oblong slot (20) in the lock arm (18), causing the first portion of the movement of the yoke not to be transmitted to the lock arm (18).

7. Hook assembly as claimed in claim 3, characterized in that the lock arm (18) is biased by a spring (29) to pivot around stud (19) for introducing the peg (28) into the locking notch (22), and in that the locking device (32) is adjustable for blocking the pivoting movement of the lock arm (18).

8. Hook assembly as claimed in claim 1, characterized in that the latch-ejector unit (31) comprises two mutually spaced plates straddling the hook (4) and mutually connected at least by one pivot on which they are rotatably journalled in the hook and by an additional pivot on which the lifting link is articulately journalled, and in that the plates have the general shape of a V, the one shank (31a) of the V-shape forming the latch and the other shank (31b) of the V-shape forming the ejector.

9. Hook assembly as claimed in claim 1, characterized by a locking device (32) for selective blocking of the transmission of the accumulated energy of the energy-accumulating member (15) to the operating device (24, 30) of the latch-ejector unit (31) via the locking and transmitting link system (12, 18–22).

10. Hook assembly as claimed in claim 1, characterized in that the body is a cylindrical central tube (3a) in which a shank (9) connected to the lifting eye bolt (2) is slidably guided, said shank being provided, for limiting its movement within the central tube (3a), with a lifting shaft (10) diametrically extended through the shank (9) and protruding with its ends past the outer surface of the shank (9) and extending through respective slits (11) in the central tube limiting the movement of the shank (9) and thereby of the lifting eye bolt (2) by contact of the lifting shaft (10) with the upper and lower ends of the slits (11).

11. Hook assembly as claimed in claim 9, characterized in that the body is a cylindrical central tube (3a) in which a shank (9) connected to the lifting eye bolt (2) is slidably guided, said shank being provided, for limiting its movement within the central tube (3a), with a lifting shaft (10) diametrically extended through the shank (9) and protruding with its ends past the outer surface of the shank (9) and extending through respective slits (11) in the central tube limiting the movement of the shank (9) and thereby of the lifting eye bolt (2) by contact of the lifting shaft (10) with the upper and lower ends of the slits (11).

12. Hook assembly as claimed in claim 4, characterized in that the energy-accumulating member (15) is a gas spring acting between the yoke (12) and an upper flange (3b) secured to the upper end of the body (3).

13. Hook assembly as claimed in claim 4, characterized in that the damper (16) acts between the yoke (12) and a loewr flange (3c) secured to the lower end of the body (3), in that the damper has a degressive function such as to perform its greatest damping force during the first part of the downwardly directed movement of the yoke (12) and in that the stud (19) mounted in the bracket (17) moves in an oblong slot (20) in the lock arm (18), causing the first portion of the movement of the yoke not to be transmitted to the lock arm (18).

14. Hook assembly as claimed in claim 5, characterized in that the damper (16) acts between the yoke (12) and a lower flange (3c) secured to the lower end of the body (3), in that the damper has a degressive function such as to perform its greatest damping force during the first part of the downwardly directed movement of the yoke (12) and in that the stud (19) mounted in the bracket (17) moves in an oblong slot (20) in the lock arm (18), causing the first portion of the movement of the yoke not to be transmitted to the lock arm (18).

15. Hook assembly as claimed in claim 4, characterized in that the lock arm (18) is biased by a spring (29) to pivot around stud (19) for introducing the peg (28) into the locking notch (22), and in that the locking device (32) is adjustable for blocking the pivoting movement of the lock arm (18).

16. Hook assembly as claimed in claim 5, characterized in that the lock arm (18) is biased by a spring (29) to pivot around stud (19) for introducing the peg (28) into the locking notch (22), and in that the locking device (32) is adjustable for blocking the pivoting movement of the lock arm (18).

17. Hook assembly as claimed in claim 6, characterized in that the lock arm (18) is biased by a spring (29) to pivot around stud (19) for introducing the peg (28) into the locking notch (22), and in that the locking device (32) is adjustable for blocking the pivoting movement of the lock arm (18).

18. Hook assembly as claimed in claim 7, characterized in that the latch-ejector unit (31) comprises two mutually spaced plates straddling the hook (4) and mutually connected at least by one pivot on which they are rotatably journalled in the hook and by an additional pivot on which the lifting link is articulately journalled, and in that the plates have the general shape of a V, the one shank (31a) of the V-shape forming the latch and the other shank (31b) of the V-shape forming the ejector.

* * * * *